UNITED STATES PATENT OFFICE.

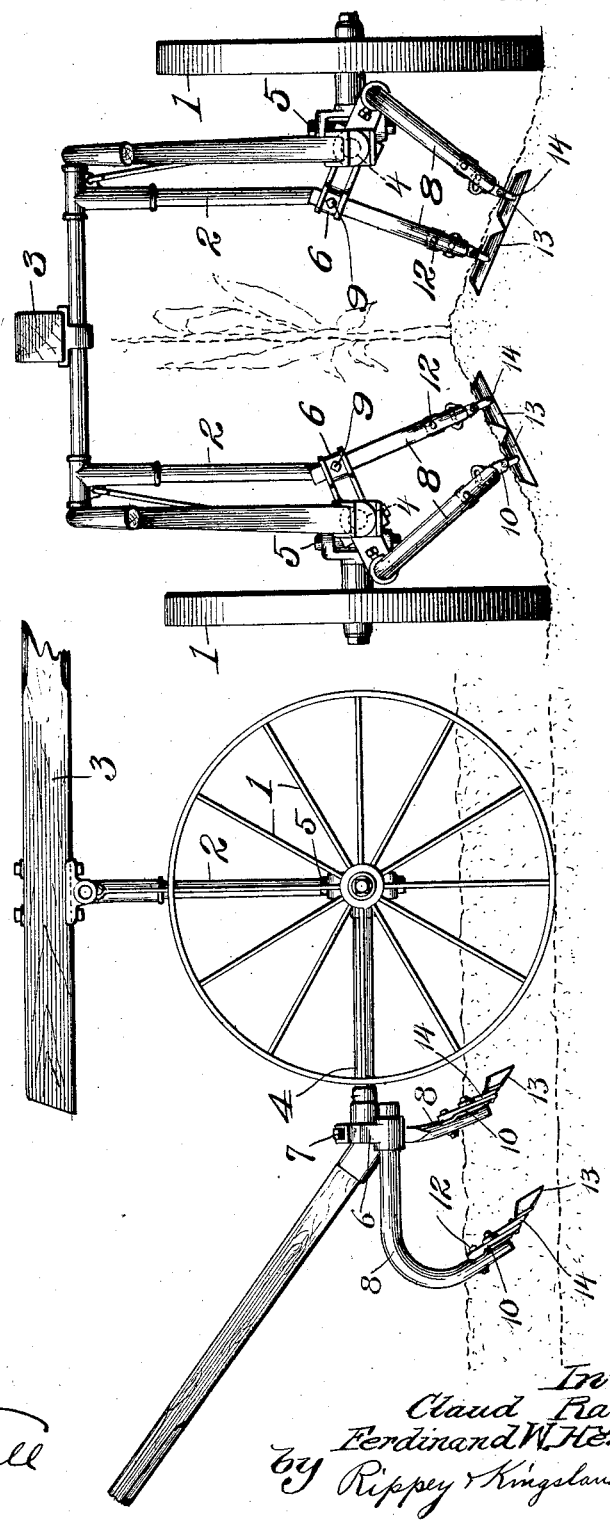

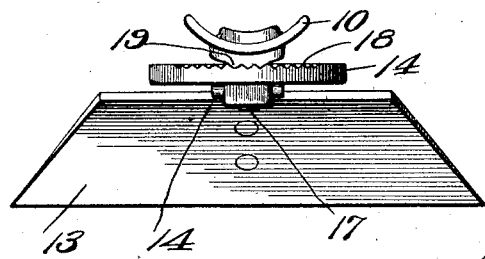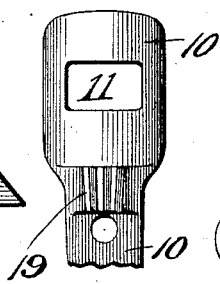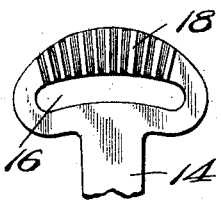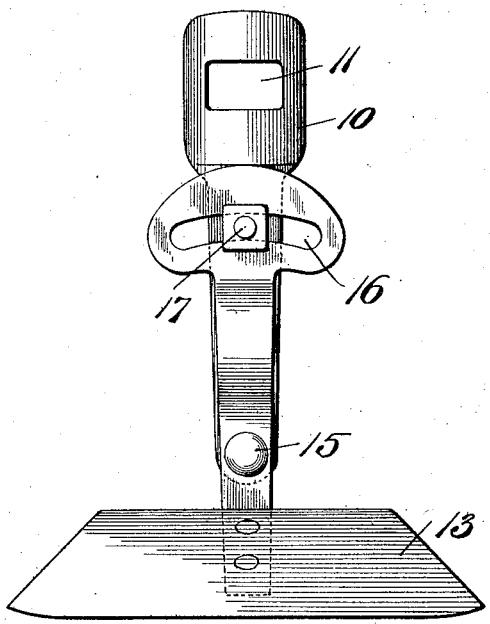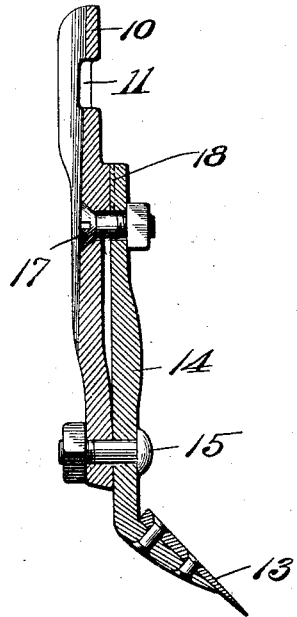

CLAUD RAYBOURN AND FERDINAND W. HERTEL, OF OKEMAH, OKLAHOMA.

CULTIVATOR.

1,047,564.  Specification of Letters Patent.  Patented Dec. 17, 1912.

Application filed October 16, 1911. Serial No. 654,951.

*To all whom it may concern:*

Be it known that we, CLAUD RAYBOURN and FERDINAND W. HERTEL, citizens of the United States, residing at the city of Okemah, county of Okfuskee, State of Oklahoma, have invented a new and useful Cultivator, of which the following is a specification.

This invention has reference to cultivators, and in a specific sense to attachments to be used in the place of the usual plows so that the cultivator can be used satisfactorily for cultivating rows upon ridges or in furrows without materially changing the arrangement of the soil.

An object of the invention is to provide an attachment for the purposes mentioned, comprising a blade adjustable obliquely, but nearer to a horizontal than to a vertical plane, and arranged to cut through and under the soil effectively to destroy the weeds and other vegetation without lateral movement of the soil. This permits the use of the attachments in the place of the usual plows or shovels on cultivators and enables the operator and driver of the cultivator to cultivate the field without materially disturbing or changing the contour of the surface of the field, whether it be smooth and level or whether the rows be in furrows or upon ridges.

Another object is to provide a device of the character described with provisions for adjusting and holding the soil cutting blade of the attachment in different adjustments, as required for the cultivation of ridges, or furrows, or level and smooth surfaces.

There are other objects which do not require specific mention, and which will appear from the following detailed description in which reference is made to the accompanying drawings, in which—

Figure 1 is an illustration of certain essential parts of a cultivator having our attachments in connection therewith. Fig. 2 is a rear elevation showing the cultivator and attachments arranged for the cultivation of ridges. Fig. 3 is a top view of the improved attachment detached from the cultivator. Fig. 4 is a front elevation. Fig. 5 is a vertical sectional view showing the connections between the several parts of the attachment. Fig. 6 is a front view of a portion of one member of the attachment showing the teeth with which the arm on the blade support engages. Fig. 7 is a view of a part of the arm constituting the blade support showing the teeth which engage with the teeth of the part shown in Fig. 6, and a slot which permits lateral adjustment of the blade supporting arm. Fig. 8 is a sectional view for showing the device for holding the supporting arms for the standards in any desired adjustment on the beams.

It will be understood that we do not restrict ourselves to the use of our present invention upon specific kind or make of cultivator. Therefore, we have deemed it unnecessary to illustrate the entire mechanism embodied in the cultivator, but have illustrated only so much of a cultivator as to render apparent the scope and the purposes and the utility of the invention. In the conventional illustration of Figs. 1 and 2 the wheels 1 support the arch 2 and the draft devices, such as the tongue 3. The beams 4 are connected with the arch or frame 2 by the usual universal pivot or hinge connections 5 which permit all necessary movements and operations of the beams 4. In the embodiment shown the rear ends of the beams 4 support bracket arms 6, which are capable of adjustment to any desired angle or position on the beams and are provided with screws 7 to hold them in any desired adjustment. Each of the arms 6 carries a number of standards 8. One of the standards 8 on each bracket 6 can be angled with respect to the bracket 6, while the other standard 8 can be axially rotated in a socket in which it is mounted at the end of the bracket, but cannot be angled relative to the bracket. By adjusting the bracket arms 6 and the standards 8, which are capable of being angled relative to said bracket arms, the plows or cutters may be adjusted for use upon smooth and level ground, or upon ridges and furrows. Bolts or set screws 9 may be utilized to hold the standards 8 in proper adjustment. The standards 8 are the parts which, ordinarily, support the plows, but which are also utilized to support the blades or cutters included in our invention.

Each blade or cutter attachment comprises two parts the details of which are clearly illustrated on Sheet 2. The supporting member 10 is concaved on one side, as shown in Fig. 3, so as to fit closely against the front side of any one of the standards 8. A rectangular hole 11 is formed in the upper portion of the member 10 and is arranged to receive the locking bolt 12, whereby the attachment is supported upon the standard 8. The blade or cutter 13 has a long cutting edge and is supported upon an extension of an arm 14. The arm 14 is pivotally mounted upon the supporting member 10 by a hinged bolt 15. The upper extremity of the arm 14 is provided with an arcuate slot 16 which is concentric with the hole through which the bolt 15 extends. A bolt 17 extends through the member 10 and through the slot 16 and is adapted to hold the blade or cutter from vibration and from displacement when in use. The rear side of the arm 14 is provided with teeth 18 arranged to interlock with corresponding teeth 19 formed on the front side of the member 10. From the foregoing it will be apparent that when the nut on the bolt 17 is tightened the teeth 18 and 19 will be securely interlocked effectively to prevent lateral movement or oscillation of the upper part of the arm 14. The arcuate slot 16 permits adjustment of the blade or cutter as required by various conditions so as to conform with the adjustments of the arms and other parts of the cultivator.

When in use the blade or cutters 13 are nearly horizontal and, therefore, will not throw or force the soil laterally whether on smooth and level ground or in furrows or upon ridges.

The foregoing description is deemed sufficient to enable anyone skilled in the art to comprehend the full purpose and use and scope of the invention.

We are aware that there may be variations in the construction of the attachment within equivalent limits, without departure from the spirit and scope of the invention. We do not restrict ourselves to identical features but

What we claim and desire to secure by Letters-Patent is—

1. A cultivator attachment comprising a bracket arm, a standard carried by said bracket arm, means for holding said bracket arm in different adjustments to carry said standard in different positions, a supporting member attached to, and extending below, said standard, teeth on said supporting member, an arm pivoted near the lower end of said supporting member and provided with an elongated slot near its upper end, a bolt passing through said slot and through said supporting member, teeth on said last-named arm engaging with the teeth on said supporting member, and a blade or cutter carried by said second-named arm below its supporting pivot, substantially as specified.

2. In a cultivator, the combination with the supporting frame, and beams pivotally carried by said frame, of a bracket arm adjustably carried by each beam, means for holding said bracket arms in different adjustments on said beams, standards adjustably carried by said bracket arms, supporting members attached to and projecting below said standards, arms pivotally carried by said supporting members, a cutter or blade on each of said last-named arms, interlocking teeth on said supporting members and said last-named arms, and means holding said teeth interlocked, substantially as described.

3. In a cultivator, a supporting member, an arm, a pivot intermediate of the ends of said arm supporting said arm on said supporting member, a wide cutter or blade rigidly attached to said arm, substantially at right-angles thereto below said pivot, and locking means whereby said arm may be locked in any desired adjustment effectively to hold said cutter or blade in any desired lateral adjustment, substantially as specified.

4. In a cultivator, a standard, a supporting member removably attached to said standard, a pivot carried by said supporting member near the lower end thereof, teeth on said supporting member above said pivot, an arm carried on said pivot and provided with an arcuate slot near the upper end thereof, said slot being practically concentric with said pivot, teeth on said arm engaging with said teeth on said supporting member, a bolt passing through said supporting member and through said slot and arranged to hold said teeth on said supporting member and on said arm interlocked, an oblique extension integral with said arm below said pivot, and a wide blade or cutter attached to said extension, substantially as specified.

In witness whereof, we have signed this specification in the presence of two subscribing witnesses.

CLAUD RAYBOURN.
FERDINAND W. HERTEL.

Witnesses:
C. R. LINDSEY,
R. A. HOCKENSMITH.

---

Copies of this patent may be obtained for five cents each, by addressing the "Commissioner of Patents, Washington, D. C."